UNITED STATES PATENT OFFICE.

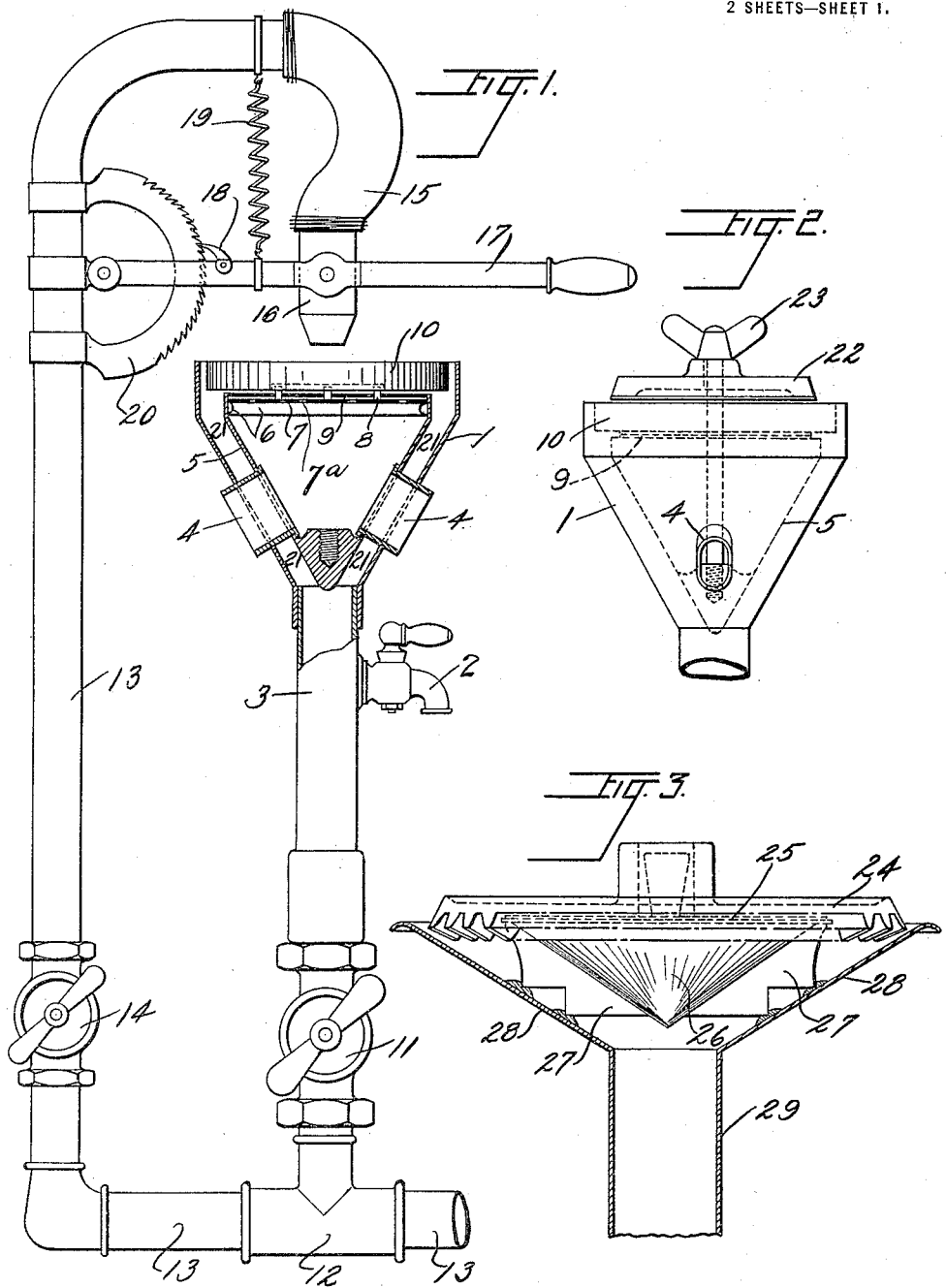

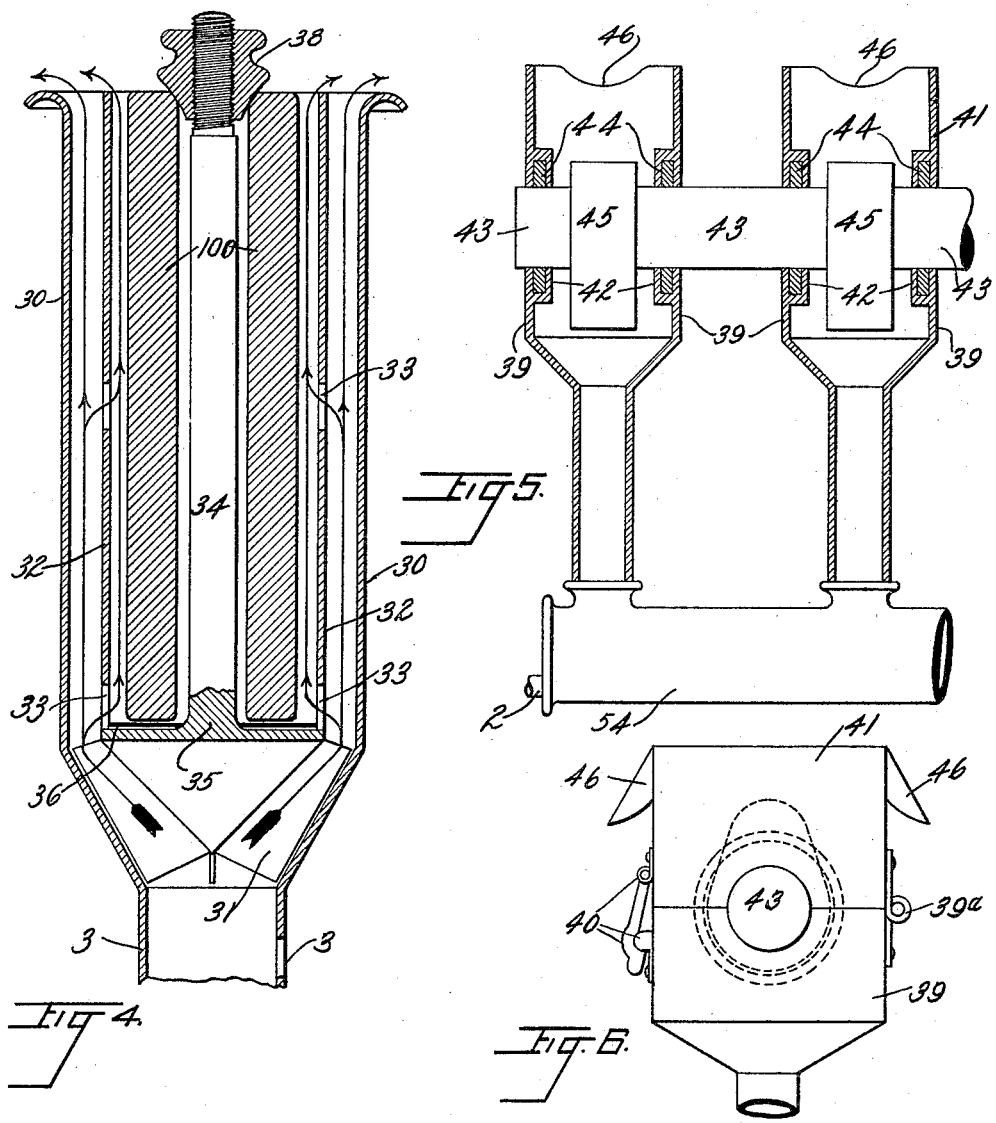

WILHELM ALLABOR AND JEAN ALLABOR, OF RHEINECK, NEAR ST. GALLEN, SWITZERLAND.

MEANS FOR TEMPERING METAL MEMBERS.

1,163,303.  Specification of Letters Patent.  Patented Dec. 7, 1915.

Application filed July 17, 1913. Serial No. 779,509.

*To all whom it may concern:*

Be it known that we, WILHELM ALLABOR and JEAN ALLABOR, citizens of the Republic of Switzerland, residing at Rheineck, near St. Gallen, Canton of St. Gallen, Switzerland, have invented certain new and useful Improvements in Means for Tempering Metal Members, of which the following is a specification.

The essential object of this invention is to provide novel means for tempering metal members, and to temper only a certain part or parts of each member without tempering the whole member.

As is well known, the ordinary process of tempering an article consists in placing the article in a bath of water or oil. The entire member, whether large or small, is thus tempered, whereas very frequently the tempering is required only at certain points or upon certain surfaces. With the old style processes, an article is frequently tempered or hardened in such way that it is difficult to finish the parts without breaking or cracking same, and this invention is designed to overcome that difficulty. Those articles really need tempering only upon certain surfaces, and it is often a positive disadvantage to have the article tempered or hardened elsewhere; hence, it is the object of this invention to temper only those parts or surfaces of a metallic body where the tempering is really required. In the drawings, for example, the invention is shown as applied to the purpose of tempering metal wheels, and adapted to temper either the inner surface of the hub or the periphery of the wheel, or both, but without affecting the spokes or parts not requiring hardening. The drawings also show the application of the invention to certain other articles, and depict forms of apparatus designed to harden various members at certain specific points or upon certain bearing surfaces. The wheel, for example, is tempered only at two places, one being the periphery which forms the tire of a car-wheel or teeth of a gear wheel, the other being the surface where the hub engages the axle. The remainder of the wheel is not hardened, and is, therefore, more easy to work with during the other stages of manufacture, and in addition, is not deprived of its malleability. The final product, therefore, is a wheel which is tempered or hardened at the bearing surfaces, without being rendered brittle or non-malleable elsewhere. It should be understood, of course, that the specific applications of the invention shown in the drawings are merely by way of illustration and example, and that many other uses and practical applications of the invention will be evident to those skilled in the art.

In the drawings, Figure 1 is a view, partly in elevation and partly in section, of an apparatus adapted to temper both the hub and rim of a wheel; Fig. 2 is a detailed view of a form used for tempering the rim alone; Fig. 3 shows a form adapted to temper rims of miter gears; Fig. 4 shows a form adapted to temper hollow members, such as sleeves; Fig. 5 shows a form adapted to temper crank-arms or the like; Fig. 6 is a view at right angles to Fig. 5.

The conical shell 1 (Fig. 1) rests upon the pipe 3 provided with the drain cock 2. Collars 4 pierce shell 1 and support the hollow cone or guide 5 therefrom. As shown in Fig. 1, the collars 4 are secured to the cone 5 at the inner end of each collar. As the collars 4 project downwardly and at an angle to each other through the conical shell, it is manifest that the weight of the cone 5 is supported by the shell. At the top of cone 5 is a ledge 6 upon which the plate 7 rests. Pins 8 project upwardly from plate 7 through perforations in disk 9, and maintain and support the said disk in proper position above the plate. The hub of the wheel 10 rests upon said pins 8, with its rim beyond the outer edges of guide 5. The plate 7 is provided with small perforations 7ª shown in Fig. 1, which form drain holes through which the water collected upon plate is drained off.

The valve 11 controls the pipe 3, which is connected by a T-coupling 12 to water-pipe 13 provided with a valve 14. Pipe 13 communicates with a flexible member 15 having a nozzle 16. Lever 17 is pivoted to nozzle 16, and is connected to spring 19 and pawl and ratchet 20, so that nozzle 16 can be carried toward or away from the wheel 10.

To use the apparatus of Fig. 1, the valves 11 and 14 are opened and water flows through pipes 13, 15, and 3. The water from pipe 3 passes upwardly through the annular space 21 which is between the opposed separated concentric tapering walls of the members 1 and 5 to or near the top of said walls where it touches the rim or edge of wheel 10 and tempers the same. The water from pipe 15 drops upon the hub of gear 10 and passes directly inside the lower end of the same, and thence drops down upon the plate 9 which prevents the water from entering the hollow cone 5. See Fig. 1 in which the pipe 15 is shown with its lower end vertically over the gear 10. The water used to chill the hub simply mingles with the water which has passed through space 21, and escapes from the apparatus by flowing over the upper edge of shell 1. In Fig. 2, the wheel 10 is partly covered by a cap-plate 22 held in place by nut 23 which fits upon a post screwed into the hollow cone 5 near its apex. In this apparatus only the rim of the wheel 10 is touched by the water.

Fig. 3 depicts an apparatus for handling miter gears. The wheel 24 is supported upon a disk 25 (corresponding to part 9, Fig. 1). The cone 26 is supported by stepped holders 27 resting upon shell 28 connected to pipe 29. The cone 26, like the cone 5 in Fig. 1, directs the water toward the periphery of the wheel and keeps the water from touching the hub.

In Fig. 4, the sleeve 100 is to be tempered upon its outer surface only. The pipe 3 carries a casing 30 supported by the strips 31 which also carry an inner casing 32 perforated at 33. Rod 34 projects upwardly from the bed 35 retained upon supports 31. The sleeve 100 rests upon the floor 36. This water rises upwardly through pipe 3, and thence flows as indicated by the arrows. Since the sleeve 100 is held in place by the nut 38, the water engages only the outer surface of the sleeve.

In Fig. 5, the apparatus is adapted to temper only the crank-arms 45 upon the shaft 43. The casing 40 is made in two sections hinged together at 39ª, and locked or clamped at 40. Glands 42 are provided upon the walls of the casing and shaft 43 rests upon the rings 44 retained in said glands. The water, flowing upwardly through casing-members 39 and 41, escapes by the mouths 46, but in passing through the device, tempers only that part of the shaft within the casing and between the two rings 44.

In all forms of the invention the tap 2 allows the water to escape when it is no longer desired within the pipe 3, 29, or 54.

It will be observed that one of the salient features of the invention is the fact that the iron or steel member which is to be hardened or tempered is supported in suitable apparatus, which apparatus is so constructed as to permit water to touch only those edges or surfaces of the iron or steel member which are to be tempered and which will keep the water from touching the rest of the iron or steel member. This invention, therefore, will temper only such parts or surfaces as really require tempering, and will not affect the remainder of the body with which the water comes into contact. Referring again to the specific wheel 10 shown in Fig. 1, it will be observed that the water touches said wheel upon the inner bearing surface of the hub which may or may not be toothed. The stream of water which flows through the nozzle 16 is directed within the hub, and the stream of water which arrives through the passages 21 tempers the periphery of the wheel. Similarly, in Fig. 3, the stream of water which passes between the upper and lower cones 26 and 28 will temper the teeth of the miter gear 24 but will be kept out of engagement with the rest of the gear by the support 26; and in an obvious manner each of the other forms of apparatus permit the water to touch the surface or surfaces which should be hard and prevent the water from touching the remaining parts or surfaces of the metal member. It will be further observed that many changes in the details of construction of the apparatus and performance of the process may be made without departing from the scope of the invention.

We claim as our invention:

1. The combination of a pipe, an outer shell carried by said pipe and having a connection therewith, an inner shell mounted within and spaced from said outer shell, a collar secured to the inner shell and extending through the outer shell supporting said inner shell and forming a connection between the interior thereof and the exterior of said outer shell, and a support coöperating with said inner shell.

2. In an apparatus for tempering metal, an upper supply pipe for the tempering fluid having a depending nozzle, a lower supply pipe for tempering fluid having its terminal arranged beneath the nozzle of the upper supply pipe, a conical shell mounted on the said terminal of the lower supply pipe and having two concentric conical walls separated sufficiently to provide an annular passageway for the tempering fluid therethrough and a circular supporting plate for the article to be tempered arranged upon and supported from the top edge of the inner conical wall of said shell and centrally located beneath the nozzle of the upper supply pipe.

3. In an apparatus for tempering metal, an upper supply pipe having a depending nozzle, a lower supply pipe having its terminal arranged beneath the nozzle of the upper supply pipe, a conical hollow double walled shell mounted upon the terminal of the lower supply pipe and beneath the nozzle of the upper supply pipe, and a supporting plate for the article to be tempered suitably mounted upon the shell.

4. In an apparatus for tempering metal, an upper supply pipe having a depending nozzle, a lower supply pipe having its terminal arranged beneath the nozzle of the upper supply pipe, a conical hollow double walled shell mounted upon the terminal of the lower supply pipe and beneath the nozzle of the upper supply pipe, a plate suitably mounted upon the shell and having a series of vertical pins, a top draining disk mounted on the plate and having perforations through which the pins pass, said plate and pins being adapted to support an article in position to have certain desired surfaces thereof tempered.

In testimony whereof we hereunto affix our signatures in the presence of two witnesses.

WILHELM ALLABOR.
JEAN ALLABOR.

Witnesses:
F. JUDERMAN,
R. THIRIG ADJUNKLE.

Copies of this patent may be obtained for five cents each, by addressing the "Commissioner of Patents, Washington, D. C."